United States Patent [19]

Gille

[11] Patent Number: 5,435,594
[45] Date of Patent: Jul. 25, 1995

[54] DUAL AIR BAG SYSTEM FOR OCCUPANT RESTRAINT

[75] Inventor: Lennart A. Gille, West Hills, Calif.

[73] Assignee: TRW Inc., Redondo Beach, Calif.

[21] Appl. No.: 161,711

[22] Filed: Dec. 3, 1993

[51] Int. Cl.⁶ .................. B60R 21/20; B60R 21/24
[52] U.S. Cl. ................... 280/728.2; 280/729; 280/740; 280/730.1
[58] Field of Search ............... 280/729, 730 R, 728 A, 280/728 R, 728 B, 743 R, 736, 740, 742, 732, 731

[56] References Cited

U.S. PATENT DOCUMENTS

| | | | |
|---|---|---|---|
| 3,752,501 | 8/1973 | Daniel et al. | 280/729 |
| 3,767,225 | 10/1973 | Mazelsky | 280/729 |
| 3,784,223 | 1/1974 | Hass et al. | 280/740 |
| 3,788,665 | 1/1974 | Noll | 280/729 |
| 4,136,894 | 1/1979 | Ono et al. | 280/729 |
| 4,810,005 | 3/1989 | Fohl | 280/732 |

FOREIGN PATENT DOCUMENTS

| | | | |
|---|---|---|---|
| 3833888 | 4/1990 | Germany | 280/729 |
| 4008960 | 9/1991 | Germany | 280/728 R |
| 0314646 | 12/1989 | Japan | 280/729 |
| 4166450 | 6/1992 | Japan | 280/730 R |
| 4283144 | 10/1992 | Japan | 280/728 R |

*Primary Examiner*—Margaret A. Focarino
*Assistant Examiner*—Peter C. English

[57] ABSTRACT

An inflatable vehicle passenger restraint system has an inner and an outer air bag which are both coupled to a manifold which provides inflation gas produced by a gas generator. When the gas generator is activated, inflation gas quickly inflates the smaller inner bag and simultaneously inflates the outer bag at a slightly slower rate, thereby fully protecting an out of position occupant.

19 Claims, 2 Drawing Sheets

DUAL AIR BAG SYSTEM FOR OCCUPANT RESTRAINT

BACKGROUND AND SUMMARY OF THE INVENTION

The present invention relates to an inflatable vehicle passenger restraint system that momentarily restrains an occupant during the critical instant of an impact. More particularly, the present invention relates to such a system incorporating dual air bags, where an inner air bag is located within an outer air bag.

Inflatable restraint systems have become commonplace for passenger protection. Current federal regulations require all automobiles manufactured within the United States to be equipped with a passive restraint system, either an inflatable restraint system such as an air bag or a passive seat belt.

A typical inflatable restraint system includes three basic components: a crash sensing mechanism which mounts to the vehicle frame, an air bag assembly located within the passenger compartment and a gas generator to deploy and inflate the air bag. In operation, the air bag is inflated before there is appreciable vehicle—occupant interaction. The air bag must have sufficient capacity to arrest the forward motion of the occupant relative to the vehicle interior without allowing the occupant to penetrate through the air bag and impact the underlying vehicle structure.

While single bag construction remains the predominant approach, inflatable occupant restraint systems incorporating multiple air bags have been proposed in the prior art. For example, a typical arrangement having multiple air bags inflates a first air bag to envelope the occupant and a second air bag which functions as a knee bolster is disclosed in U.S. Pat. No. 4,360,223 issued to Kirchoff.

None of the prior art, however, is without its problems. The biggest problem inherent in traditional inflatable restraint systems is a lack of flexibility to adequately provide protection for occupants of a vehicle other than the driver. The difficulty in protecting passengers other than the driver is the potential of those passengers being "out of position." Passengers other than the driver are not as constrained as to how or where they position themselves within the vehicle. Most danger to the "out of position" occupant occurs when they are located in a position forward of a seated position and, therefore, contact the bag while it is still rapidly expanding.

Inflatable restraint systems are designed to deploy and inflate during the time interval between the initial sensing of the impact by a crash sensing mechanism and the resulting forward movement of the occupant relative to the vehicle. Because this time interval lasts only milliseconds, the air bag must inflate with a tremendous flow rate of gas. This tremendous flow rate produces what is referred to as a "hard fill". This "hard fill" can be likened to a small explosion that is contained by the air bag.

Ideally, the forces produced during inflation are entirely self-contained by the air bag through its full expansion before the occupant comes in contact with the air bag. Should the occupant be improperly seated, or "out of position", the impact of the explosion may be partially absorbed by the occupant. As a result, the occupant may suffer injury from the expansion process as well as the accident.

The present invention provides an inflatable restraint system in which the air bag which restrains the occupant is inflated at a softer fill rate, thereby minimizing injury resulting from the rapid inflation of the air bag. The present invention also provides an inflatable restraint system suitable for after-market application.

BRIEF DESCRIPTION OF THE DRAWINGS

The various advantages of the present invention will become apparent to those skilled in the art after reading the following specification and by reference to the drawings in which.

DETAILED DESCRIPTION OF THE PREFERRED EMBODIMENT

Figure 1:
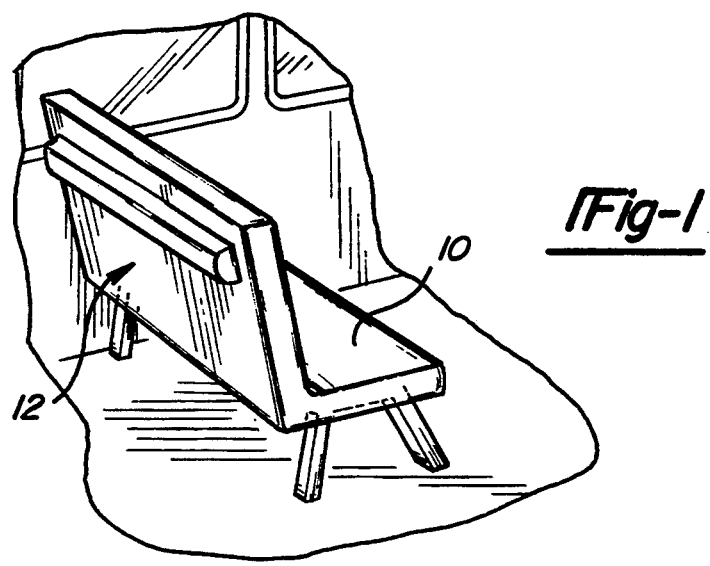
FIG. 1 is a perspective view of an apparatus made in accordance with the preferred embodiment of this invention shown attached to the rear of a school bus seat.
Figure 2:
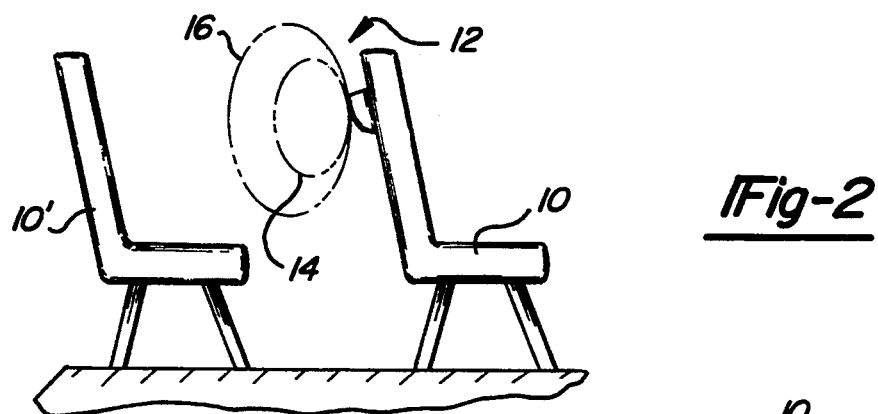
FIG. 2 is a right-side view of the apparatus with the inner and outer air bags shown in phantom fully expanded and inflated.

In FIG. 1 there is illustrated a seat 10 for a school bus having an inflatable restraint apparatus 12 of the present invention, attached thereto. FIG. 2 illustrates a side view of the school bus seat 10 with the restraint apparatus 12 of the present invention attached thereto. The restraint apparatus is designed to protect one or more occupants (not shown) located in a second seat 10'. The inner air bag 14 and outer air bag 16 are shown in phantom fully expanded and inflated.

Figure 3:
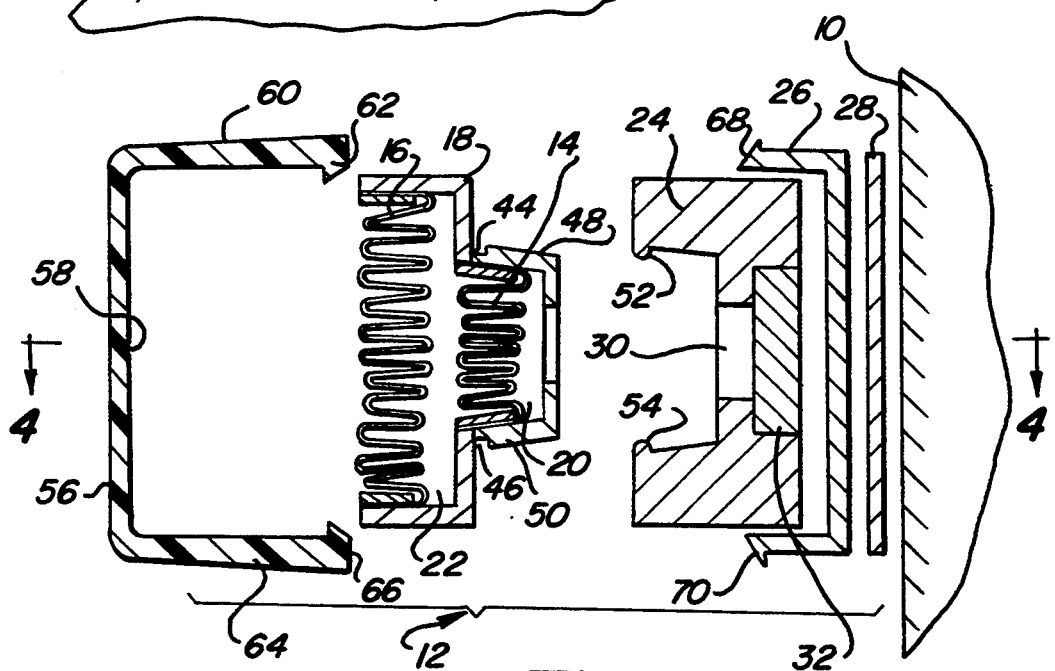
FIG. 3 is a partially exploded sectional left-side view of the apparatus.
Figure 4:
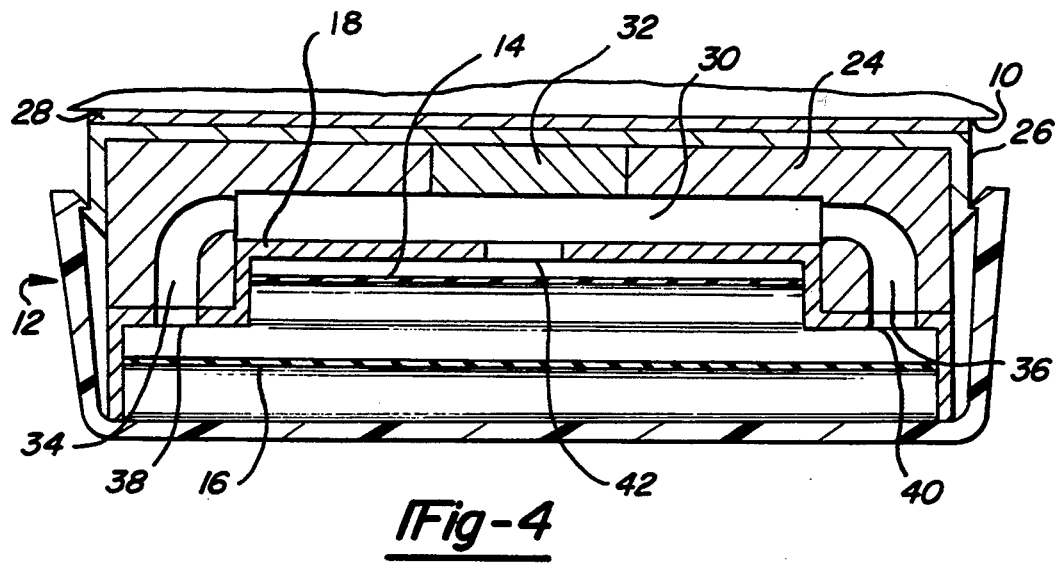
FIG. 4 is a sectional view of the gas generator and attached manifold of the present invention taken along lines 4—4 of FIG. 3.

Referring generally to FIGS. 3 and 4, the inflatable restraint apparatus 12 of the present invention is shown in greater detail. The apparatus includes an air bag housing 18 which is constructed of material impervious to inflation gas and is designed to withstand the high gas pressures that are produced. The housing 18 contains both the inner air bag 14 and the outer air bag 16 which, prior to activation, are in a stored, or pre-inflated state.

The air bags 14,16 are securely attached to the housing 18. The air bag housing 18 is an elongated member capable of spanning substantially the entire length of a bus seat. In the preferred embodiment, the air bag housing 18 defines an inner bag cavity 20 and an outer bag cavity 22. The inner bag 14 is securely attached to the interior portion of the air bag housing 18 which defines the inner bag cavity 20 while the outer bag 16 is securely attached to the interior portion of the air bag housing 18 which defines the outer bag cavity 22.

The air bag housing 18 attaches directly to a gas generator housing 24, which, in turn, attaches to the unit mounting plate 26. Between the mounting plate 26 and the seat 10 is located a gasket 28. The gasket 28 is formed from plastic or rubber.

As illustrated in FIG. 4, the gas generator housing 24 and the air bag housing 18 of the preferred embodiment define a manifold 30. Alternatively, the manifold 30 could be defined entirely by the gas generator housing 24. In the preferred embodiment, a gas generator 32 is securely mounted the to gas generator housing 24. The gas generator 32, which may be of any suitable type, is operatively coupled to a crash sensing mechanism (not shown). The crash sensing mechanism is arranged to sense crash impacts of a vehicle from a speed, typically of 12 to 15 miles per hour or greater. Such impacts will trigger the gas generator 32 to produce inflation gas such as nitrogen gas, to fill the inner and outer air bags 14,16. Where multiple inflatable restraint systems 12 are incorporated into a single vehicle, all of the gas generators 32 can be coupled to a single crash sensing mechanism.

In a vehicle in which multiple inflatable restraint systems 12 of the present invention are incorporated it may alternatively be desired to connect multiple systems 12 to a single gas generator 32.

The gas generator housing 24 of the preferred embodiment, includes two passage ways 34,36 which are in communication with the manifold 30. The passage ways 34,36 serve to route inflation gas to aligning first and second discharge ports 38,40, respectively, which are provided in the air bag housing 18. The first and second discharge ports 38,40 directly provide inflation gas to the outer air bag cavity 22, thereby inflating the outer air bag 16. A third gas discharge port 42 is provided in the air bag housing 18 directly adjacent the manifold 30.

When inflation gas is generated by the gas generator 32, the inflation gas simultaneously inflates the inner air bag 14 through the third gas discharge port 42 and the outer air bag 16 through both the first gas discharge port 38 via the first passage way 34 and the second gas discharge port 40 via the second passage way 36. When the inner air bag 14 becomes fully inflated, the remaining inflation gas produced is then diverted to complete the inflation of the outer bag 16. The fill rate of the air bags 14,16 as well as the proportional flow into each bag can be directly adjusted by altering the size of the gas discharge ports 38,40,42.

Further, in the preferred embodiment, the total area of the two gas discharge ports 38,40 serving to fill the outer air bag 16 is approximately equivalent to the area of third gas discharge port 42 which serves to fill the inner bag 14. This design causes the inner air bag 14, because of its smaller volume and equivalent fill rate, to achieve a "hard fill" and fully expand much sooner than the outer air bag 16 which will expand with a "softer" fill rate in order to protect the occupants.

The in-position occupant will thus encounter completely filled inner and outer air bags 14,16, thereby providing additional security in case the outer bag 16 ruptures. Alternatively, should the inner air bag 14 rupture, the occupant will be cushioned by the outer bag 16. The probability of both bags 14,16 simultaneously rupturing is significantly less than that of either bag 14,16 rupturing alone.

The out-of-position occupant may encounter the outer air bag 16 prior to its full expansion. The slower fill rate concept of the present invention provides a reduced impact on the occupant from the outer bag 16 expansion. In such a situation, the outer air bag 16, which is not fully expanded, will have a reduced cushioning effect, but will be compensated in a significant degree by the hard fill of the inner air bag 14.

The air bag housing 18 has first and second channels 44,46 formed in the inner periphery of the top and bottom horizontal surfaces 48,50 which define the inner air bag cavity 20. The channels 44,46 accept first and second ribs 52,54 formed in the gas generator housing 24, thereby serving to retain the air bag housing 18. This type of non-invasive mounting reduces any air leakage in the system. If necessary, additional means for fastening, such as screws may be incorporated. The gas generator housing 24 can be attached to the mounting plate 26 with adhesive alone, or if necessary, in combination with screws, clips or bolts.

While stored, the air bags 14,16 of the present invention are enclosed by a cover 56. The cover 56 is constructed with a urethane type foam and further covered with vinyl. The cover 56 is prescored with fracture lines 58 in order to facilitate air bag egress through the cover 56. The cover 56 includes sufficient padding to provide cushioning for minor impacts.

As seen in FIG. 3, the cover 56 for the inflatable restraint apparatus 12 includes a top edge 60 with a first inwardly extending portion 62 and a bottom edge 64 with a second inwardly extending portion 66. The inwardly extending portions 62,66 serve to cooperatively engage first and second outwardly extending portions 68, 70 of the mounting plate 26, respectively.

In operation, the inflatable restraint apparatus 12 of the present invention is activated by a signal delivered from the crash sensing mechanism (not shown). When gas is generated, the initial resultant flow rate into the inner bag 14 and the outer bag 16 is approximately identical. Since the outer air bag 16 is substantially larger in volume than the inner air bag 14, the identical flow rates cause the inner air bag 14 to fully inflate and expand first. As the inner bag 14 fills, it will begin to offer a higher resistance to additional filling while the outer bag 16 still has a great pressure differential and lower pressure. Additional inflation gas will be diverted from the inner bag 14 to fill the outer bag 16, thus providing a gradually faster fill rate for the outer bag 16. When the inner bag 14 is completely expanded, the outer bag 16 will complete its filling using the remaining gas generated. This sequence of inflation allows the inner air bag 14 to inflate with a hard fill, thereby becoming quickly operative, while still allowing the outer air bag 16 to fill with a softer fill to better protect the occupant from injury.

Figure 5:
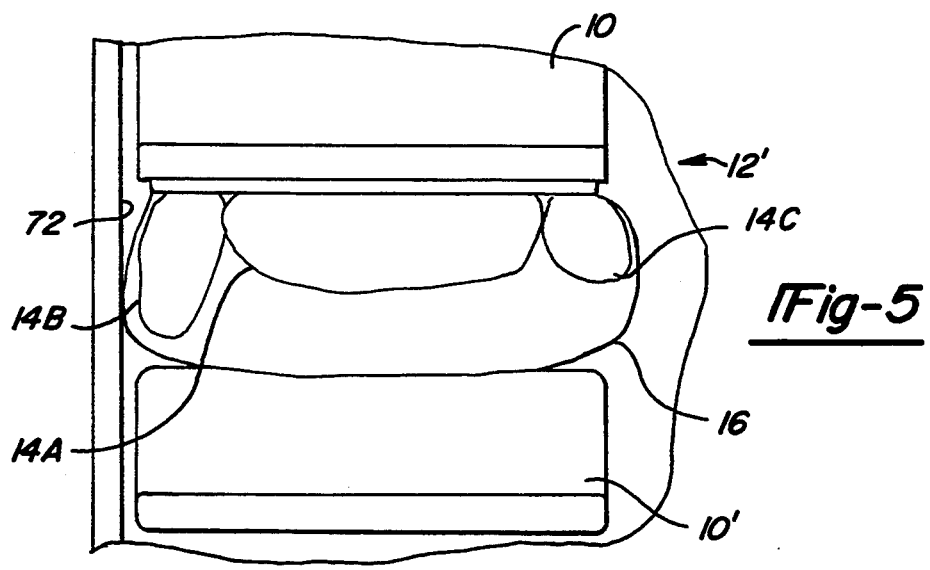
FIG. 5 is a top view of an alternative embodiment of the present invention incorporating multiple inner bags.

Referring next to FIG. 5, illustrated is an alternative embodiment of the present invention. In this embodiment, additional inner air bags are incorporated in order to protect the vehicle occupants. Specifically, a main or first inner bag 14A serves to cushion the occupant against forward impact. A second inner bag 14B cushions against impact with the vehicle wall 72 and a third inner bag 14C cushions against impact with the edge of the seat 10.

Although the invention has been described in detail with reference to a certain preferred embodiment and specific examples, variations and modifications exist within the scope and spirit of the invention as described and as defined in the claims. For example, it is envisioned that two or more gas generators could be incorporated. A first gas generator would force gas through a first manifold to an inner air bag 14 and a second gas generator would independently force gas through a second manifold into an outer bag 16. Such a construction would allow for independent fill of the inner and outer air bags 14,16, thereby allowing the air bags 14,16 to achieve different ultimate pressures upon full expansion. This alternative construction, while not preferred because of increased manufacturing expense and other factors, should fall within the spirit of this invention.

Further, it is envisioned that the subject inflatable restraint system could be incorporated into numerous other vehicle types. For example, an inexhaustive list of adaptable vehicles would include the illustrated bus, a individual passenger car, taxi cabs, trucks, and trains. It is also envisioned that the subject invention could be incorporated in rest rooms, service and express areas on trains, buses, airplanes, etc., where passengers otherwise would not have the benefit of any restraint system. These alternative applications should also fall within the spirit of this invention.

While the above constitutes the preferred embodiment of the invention, it will be appreciated that the invention is susceptible to modification, variations, and change without departing from the proper scope or fair meaning of the claims.

What is claimed is:

1. An inflatable restraint apparatus for use in a vehicle comprising:
   a horizontally elongated air bag housing including a first portion defining an inner air bag cavity;
   an inner and an outer air bag, each securely attached to said air bag housing, Said inner air bag being received into said inner air bag cavity; and
   a gas generator housing including an inflator for generating a gas when activated, said gas generator housing having a horizontally extending cavity, said cavity receiving said first portion of said air bag housing.

2. The apparatus of claim 1 wherein said inner air bag, when fully inflated, is disposed substantially within said outer air bag.

3. The apparatus of claim 1 which further comprises:
   a mounting plate attached to said gas generator housing; and
   means for mounting said mounting plate to the vehicle.

4. The apparatus of claim 3 wherein said outer air bag has a substantially greater volume than said inner air bag.

5. The apparatus of claim 4 further comprising a manifold disposed between said air bag housing and said gas generator housing, said manifold defined at least in part by said air bag housing and said gas generator housing, said manifold being in fluid communication with said gas generator housing and having a plurality of gas discharge ports, at least one of said plurality of gas discharge ports being in communication with said inner air bag, and at least one of said plurality of gas discharge ports being in communication with said outer air bag, and further wherein said at least one gas discharge port in communication with said inner air bag and said at least one gas discharge port in communication with said outer air bag produce a substantially equal flow rate of said gas, whereby said inner air bag is completely inflated before said outer air bag is completely inflated.

6. The apparatus of claim 5 further including a cover attached to said mounting plate to complete a container for said inner and outer air bags.

7. The apparatus of claim 6 wherein said mounting plate has a top edge having a first outwardly extending portion and a bottom edge having a second outwardly extending portion and wherein said cover has a front face, a top and a bottom, said top and said bottom having first and second inwardly extending portions, respectively, whereby said first and second inwardly extending portions cooperatively engage said first and second outwardly extending portions to removably connect the cover to the mounting plate.

8. An inflatable restraint apparatus for use in a vehicle comprising:
   an inner air bag and an outer air bag;
   a horizontally elongated air bag housing, said inner and outer air bags being attached to said air bag housing, said air bag housing including a first portion defining an inner air bag cavity for storing said inner air bag and a second portion defining an outer air bag cavity for storing said outer air bag, said inner and outer air bags being disposed substantially within said inner and outer air bag cavities, respectively; and
   a gas generator housing including an inflator for generating a gas when activated, said gas generator housing including a substantially rectangular cavity cooperatively receiving said first portion of said air bag housing.

9. The apparatus of claim 8 wherein said inner air bag, when fully inflated, is disposed substantially within said outer air bag.

10. The apparatus of claim 8 which further comprises:
    a mounting plate attached to said gas generator housing; and
    means for mounting said mounting plate to the vehicle.

11. The apparatus of claim 10 wherein the outer air bag has a substantially greater volume than said inner air bag.

12. The apparatus of claim 11 further including a cover attached to said mounting plate to complete a container for said inner and outer air bags.

13. The apparatus of claim 12 wherein said mounting plate has a top edge having a first outwardly extending portion and a bottom edge having a second outwardly extending portion and wherein said cover has a front face, a top and a bottom, said top and said bottom having first and second inwardly extending portions, respectively, whereby said first and second inwardly extending portions cooperatively engage said first and second outwardly extending portions to removably connect the cover to the mounting plate.

14. The inflatable restraint apparatus of claim 8, further comprising a manifold disposed between said air bag housing and said gas generator housing, said manifold defined at least in part by said air bag housing and said gas generator housing, said manifold being in fluid communication with said gas generator housing and having a plurality of gas discharge ports, at least one of said plurality of gas discharge ports being in direct communication with said inner cavity, and at least one of said plurality of gas discharge ports being in direct communication with said outer cavity.

15. The apparatus of claim 14 wherein said at least one gas discharge port in direct communication with said inner air bag cavity and said at least one gas discharge port in direct communication with said outer air bag cavity produce a substantially equal flow rate of said gas.

16. A dual air bag inflatable restraint apparatus for use in a vehicle, the apparatus comprising:
    a horizontally elongated air bag housing including a first portion defining an inner air bag cavity and a second portion defining an outer air bag cavity;
    a first inner air bag securely attached to said first inner air bag cavity;
    an outer air bag securely attached to said outer air bag cavity;

a gas generator housing including an inflator for generating a gas when activated, said gas generator housing including a horizontally extending cavity cooperatively receiving said first portion of said air bag housing, said gas generator housing further including first and second horizontally extending passageways in fluid communication with said horizontally extending cavity and said outer air bag; and a manifold disposed between said air bag housing and said gas generator housing and defined in part by said air bag housing and said gas generator housing, said manifold being in fluid communication with said inflator and having a plurality of gas discharge ports, at least one of said plurality of gas discharge ports being in communication with said inner air bag cavity, and at least one of said plurality of gas discharge ports being in communication with said outer air bag cavity.

17. The apparatus of claim 16, wherein said first inner air bag, when fully inflated, is disposed substantially within said outer air bag.

18. The apparatus of claim 17, wherein said inner air bag cavity is partially defined by first and second horizontally extending walls depending from said second portion of said air bag housing.

19. The apparatus of claim 18, wherein said first and second horizontally extending walls each include a horizontally extending channel, and further wherein said gas generator housing includes first and second horizontally extending ribs received by said channels of said first and second horizontally extending walls, respectively, for retaining said first portion of said air bag housing in said horizontally extending cavity.

* * * * *